US009732862B2

(12) United States Patent
Schiller et al.

(10) Patent No.: US 9,732,862 B2
(45) Date of Patent: *Aug. 15, 2017

(54) TWO EDUCATOR/FOUR-WAY SELECTOR VALVE ASSEMBLY

(71) Applicant: Diversey, Inc., Sturtevant, WI (US)

(72) Inventors: Steven E. Schiller, Kenosha, WI (US); James H. Lohr, Union Grove, WI (US); Paul J. Larson, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/166,544

(22) Filed: Jan. 28, 2014

(65) Prior Publication Data
US 2014/0158209 A1 Jun. 12, 2014

Related U.S. Application Data (63) Continuation of application No. 13/482,062, filed on May 29, 2012, now Pat. No. 8,636,031, which is a
(Continued)

(51) Int. Cl.
*F16K 11/20* (2006.01)
*F16K 11/02* (2006.01)
(Continued)

(52) U.S. Cl.
CPC .............. *F16K 11/02* (2013.01); *B01F 5/043* (2013.01); *F16K 11/076* (2013.01);
(Continued)

(58) Field of Classification Search
USPC ...... 137/597, 625.15, 625.16, 625.4, 625.41, 137/625.46, 625.47
See application file for complete search history.

(56) References Cited

U.S. PATENT DOCUMENTS

| D118,448 S | 1/1940 | Helms |
|---|---|---|
| 2,881,802 A | 4/1959 | Crawford |

(Continued)

FOREIGN PATENT DOCUMENTS

| AU | 2006280234 | 2/2008 |
|---|---|---|
| BR | PI0614689-9 | 4/2011 |

(Continued)

OTHER PUBLICATIONS

Examination Report from the Patent Office of the Government of India for Ref. No. POD/Application No. 1019/KOLNP/2008 dated Jul. 14, 2016 (8 pages).
(Continued)

*Primary Examiner* — John Fox
(74) *Attorney, Agent, or Firm* — Michael Best & Friedrich LLP (57) ABSTRACT

A method of controlling the flow of different flow paths of fluid is provided. The method includes rotating a valve to a first position, receiving a first concentrate in the first position, discharging the first concentrate through one of two outlets, rotating the valve to a second position, receiving a second concentrate in the second position, and discharging the second concentrate through one of the two outlets.

43 Claims, 5 Drawing Sheets

Related U.S. Application Data continuation of application No. 12/063,333, filed as application No. PCT/US2006/030399 on Aug. 3, 2006, now Pat. No. 8,186,383.

(60) Provisional application No. 60/707,399, filed on Aug. 11, 2005.

(51) Int. Cl.
*B01F 5/04* (2006.01)
*F16K 11/076* (2006.01)
*F16K 11/085* (2006.01)

(52) U.S. Cl.
CPC .......... *F16K 11/0856* (2013.01); *F16K 11/20* (2013.01); *Y10T 137/0318* (2015.04); *Y10T 137/7837* (2015.04); *Y10T 137/7904* (2015.04); *Y10T 137/8259* (2015.04); *Y10T 137/86863* (2015.04); *Y10T 137/86871* (2015.04); *Y10T 137/87249* (2015.04)

(56) References Cited

U.S. PATENT DOCUMENTS

| | | | |
|---|---|---|---|
| 3,610,535 A * | 10/1971 | Bradshaw | B01F 15/0201 239/305 |
| 3,618,637 A | 11/1971 | Santomieri | |
| 3,651,991 A | 3/1972 | Ohlson et al. | |
| D235,388 S | 6/1975 | Taylor | |
| 3,976,227 A | 8/1976 | Ray | |
| 4,356,937 A | 11/1982 | Simon et al. | |
| 5,033,649 A | 7/1991 | Copeland et al. | |
| 5,129,434 A | 7/1992 | Whigham et al. | |
| 5,159,958 A | 11/1992 | Sand | |
| 5,253,677 A | 10/1993 | Sand | |
| 5,259,557 A | 11/1993 | Spriggs et al. | |
| 5,344,074 A | 9/1994 | Spriggs et al. | |
| 5,351,875 A | 10/1994 | Rhine et al. | |
| 5,377,718 A | 1/1995 | Sand | |
| 5,400,839 A | 3/1995 | Cravett | |
| 5,452,825 A | 9/1995 | Comstock et al. | |
| D367,659 S | 3/1996 | Baker et al. | |
| 5,522,419 A | 6/1996 | Sand | |
| 5,570,816 A | 11/1996 | LaBarbera, Jr. | |
| 5,584,327 A | 12/1996 | Thomas et al. | |
| 5,653,261 A | 8/1997 | Dalhart et al. | |
| D385,746 S | 11/1997 | Fritz | |
| 5,799,831 A | 9/1998 | Spriggs et al. | |
| 5,832,972 A | 11/1998 | Thomas et al. | |
| 5,862,829 A | 1/1999 | Sand | |
| D407,092 S | 3/1999 | Weaver | |
| D408,207 S | 4/1999 | Bourke | |
| 5,902,041 A | 5/1999 | Parsons et al. | |
| 5,927,338 A | 7/1999 | Boticki et al. | |
| 5,957,152 A | 9/1999 | Dalhart | |
| 6,095,372 A | 8/2000 | Dorsey et al. | |
| 6,227,745 B1 * | 5/2001 | Privett | A46B 11/066 239/316 |
| 6,238,081 B1 | 5/2001 | Sand | |
| 6,279,598 B1 | 8/2001 | Boticki et al. | |
| 6,299,035 B1 | 10/2001 | Dalhart | |
| 6,322,242 B1 | 11/2001 | Lang et al. | |
| 6,363,977 B1 | 4/2002 | Smeller et al. | |
| 6,398,134 B1 * | 6/2002 | Hickson | B05B 1/16 239/390 |
| 6,412,527 B1 | 7/2002 | Brice | |
| 6,439,272 B1 | 8/2002 | Wertheim | |
| 6,499,872 B2 | 12/2002 | Sand | |
| 6,532,998 B2 | 3/2003 | Beldham et al. | |
| 6,571,805 B2 * | 6/2003 | Hoenisch | B08B 3/026 134/103.2 |
| 6,588,466 B1 | 7/2003 | Lohr | |
| 6,619,318 B2 | 9/2003 | Dalhart et al. | |
| 6,634,376 B2 | 10/2003 | Haas | |
| 6,655,401 B2 | 12/2003 | Sand et al. | |
| 6,763,860 B2 | 7/2004 | Jungmann et al. | |
| 6,789,708 B2 | 9/2004 | Hansen | |
| D498,637 S | 11/2004 | Heilstedt et al. | |
| D499,599 S | 12/2004 | Morrison | |
| 7,004,355 B1 | 2/2006 | Crisp, III et al. | |
| D523,878 S | 6/2006 | Quinlan et al. | |
| D544,287 S | 6/2007 | Joss et al. | |
| D555,287 S | 11/2007 | Long et al. | |
| D555,413 S | 11/2007 | Lin | |
| D555,415 S | 11/2007 | Lin | |
| 7,331,488 B2 | 2/2008 | Naslund et al. | |
| D571,598 S | 6/2008 | Moore | |
| D589,738 S | 4/2009 | Michler | |
| D589,988 S | 4/2009 | Martin et al. | |
| 7,516,763 B2 | 4/2009 | Bertucci et al. | |
| D608,129 S | 1/2010 | Spear et al. | |
| D619,151 S | 7/2010 | Tsuji | |
| D620,302 S | 7/2010 | Picozza et al. | |
| 7,963,304 B2 | 6/2011 | Bertucci et al. | |
| D652,674 S | 1/2012 | Bertucci et al. | |
| 8,186,383 B2 | 5/2012 | Schiller et al. | |
| D666,868 S | 9/2012 | Bertucci et al. | |
| 8,584,716 B2 | 11/2013 | Bertucci et al. | |
| 8,636,031 B2 | 1/2014 | Schiller et al. | |
| 2001/0042759 A1 | 11/2001 | Dion | |
| 2003/0056841 A1 | 3/2003 | Dalhart et al. | |
| 2004/0065673 A1 | 4/2004 | Hansen | |
| 2004/0094226 A1 | 5/2004 | Wertheim | |
| 2004/0163720 A1 | 8/2004 | Joung | |
| 2005/0150572 A1 | 7/2005 | Beldham et al. | |
| 2006/0048820 A1 | 3/2006 | Horner et al. | |
| 2006/0174778 A1 | 8/2006 | Greiwe | |
| 2006/0174779 A1 | 8/2006 | Ng | |
| 2007/0028980 A1 | 2/2007 | Lohr et al. | |
| 2010/0024915 A1 | 2/2010 | Thomas et al. | |
| 2010/0276452 A1 | 11/2010 | Vesborg et al. | |

FOREIGN PATENT DOCUMENTS

| | | |
|---|---|---|
| CA | 2618642 | 2/2007 |
| CN | 200680032809.6 | 10/2009 |
| DE | 19736982 | 8/1998 |
| EP | 0068906 | 1/1983 |
| EP | 1945978 | 10/2009 |
| FR | 2130157 | 11/1972 |
| JP | 63210485 | 9/1988 |
| JP | 2002/332670 | 11/2002 |
| JP | 2003/027541 | 1/2003 |
| JP | 2004/509020 | 3/2004 |
| JP | 2004/156387 | 6/2004 |
| JP | 2008/526084 | 7/2008 |
| KR | 10-2008-7005786 | 5/2008 |
| WO | WO 9114647 | 10/1991 |
| WO | WO 0222444 | 3/2000 |
| WO | WO 0240178 | 5/2002 |
| WO | WO 02070397 | 9/2002 |
| WO | WO 2004/031634 | 4/2004 |
| WO | PCT/US2006/030399 | 8/2006 |
| WO | WO 2007/021561 | 2/2007 |

OTHER PUBLICATIONS

Johnson Wax, "Innovative Dilution Control Systems" brochure (2000) showing the Select Dispensing Unit and the Quattro Solutions Center, 9 pages.

* cited by examiner

TWO EDUCATOR/FOUR-WAY SELECTOR VALVE ASSEMBLY

CROSS-REFERENCE TO RELATED APPLICATIONS

This application is a continuation of U.S. patent application Ser. No. 13/482,062, filed May 29, 2012, which is a continuation of U.S. Pat. No. 8,186,383, filed Oct. 15, 2008, which is a U.S. national phase application filing of International Patent Application No. PCT/US2006/030399, filed Aug. 3, 2006, which claims the benefit of and priority to U.S. Provisional patent application No. 60/707,399, filed Aug. 11, 2005, the entire contents of each of which are incorporated herein by reference.

STATEMENT REGARDING FEDERALLY SPONSORED RESEARCH OR DEVELOPMENT

None.

BACKGROUND OF THE INVENTION

Technical Field

This invention relates to a selector valve assembly. More particularly, it relates to a selector valve assembly which can regulate the flow of at least four different fluid materials in conjunction with a dispensing eductor.

Background Art

The use of selector valves in conjunction with eductors for mixing chemical concentrates into a stream of liquid to provide a diluted solution is well-known. For example, see U.S. Pat. Nos. 5,377,718 and 5,653,261.

While these selector valves can control and select four different chemical concentrates to be introduced into an eductor, there is a problem with residual carry-over when selecting from one chemical concentrate for another. This is caused by the use of the channeled disks 11 in the '718 and '261 patents.

All current selector valve systems which utilize two separate eductors to provide a high and low flow rate use two separate selector valves for each eductor. Not only does this add cost and complexity to the system, it makes the system easier for the end user to mishandle. They can have the selector valve pointed to one product of one eductor and accidentally fill a different product from the second eductor. These types of systems also require labeling of the dispenser for product identification which can also cause misuse.

There is a need for a selector valve which can be used in conjunction with an eductor mixing system which can reduce the incidence of product carry-over when a selector valve is moved from one position to another. There is also a need for a selector valve which can reduce costs and mishandling.

The objects of the invention therefore are:
a.) Providing an improved selector valve.
b.) Providing an improved selector valve for use with a liquid mixing and dispensing apparatus.
c.) Providing a selector valve of the foregoing type for use with an eductor.
d.) Providing a single selector valve of the foregoing type which can accommodate two different eductors.
e.) Providing a selector valve of the foregoing type which reduces the incidence of product carry-over.
f.) Providing a selector valve of the foregoing type which employs a minimum number of parts and reduces incidence of improper dispensing.
g.) Providing a combined selector valve and eductor assembly.

These and still other objects and advantages of the invention will be apparent from the description which follows. In the detailed description below, a preferred embodiment of the invention will be described in reference to the full scope of the invention. Rather, the invention may be employed in other embodiments.

SUMMARY OF THE INVENTION

The foregoing objects are accomplished and the shortcomings of the prior art are accomplished by the selector valve assembly of this invention which can control the flow of at least two flow paths of fluid. The selector valve assembly has a body member having a compartment with an end wall. There is an outlet passage in the end wall of the compartment and at least two passages communicate with the compartment. A rotatable member is sealably positioned in the compartment, the rotatable member having a side wall and an end wall. A first passageway extends a distance into the rotatable member from the end wall thereof. A second passageway extends through the side wall thereof and communicates with the first passageway. Rotation of the rotatable member will selectively orientate the second passageway with each of the at least two passages so as to cause liquid in the at least two passages to pass to the first and second passageways and subsequently to the outlet passage.

In a preferred embodiment, the selector valve assembly includes four passage ports connected to the body member and communicating with the second passageway in the rotatable member.

In one aspect, the selector valve assembly includes swivel ports connected to the body member and communicating with the four passages in the body member.

In another preferred embodiment, an indexing member is connected to the rotatable member.

In another aspect, the selector valve assembly includes a spring member in biasing contact with the indexing member and a spring retaining member connected to the body member and the spring member.

In yet another aspect, the selector valve assembly includes color indicator means operatively associated with each of the swivel port members.

In yet another preferred embodiment, there are two eductors connected to the outlet passage of the body member.

In still another preferred embodiment, two eductors are connected to the outlet passage of the body member by check valves.

In another aspect, a method of controlling the flow of different flow paths of fluid is provided. The method includes the steps of rotating a valve to a first position, receiving a first concentrate in the first position, discharging the first concentrate through one of two outlets, rotating the valve to a second position, receiving a second concentrate in the second position, and discharging the second concentrate through one of the two outlets.

In another aspect, a method of operating a selector valve assembly to control the flow of different flow paths of fluid is provided. The method includes the steps of rotating a member provided in the valve assembly between a plurality of positions, each position providing a fluid connection between one of a plurality of concentrates and a plurality of outlets, receiving one of the plurality of concentrates, and discharging one of the plurality of concentrates through one of the outlets.

DESCRIPTION OF THE PREFERRED EMBODIMENTS

Figure 1:
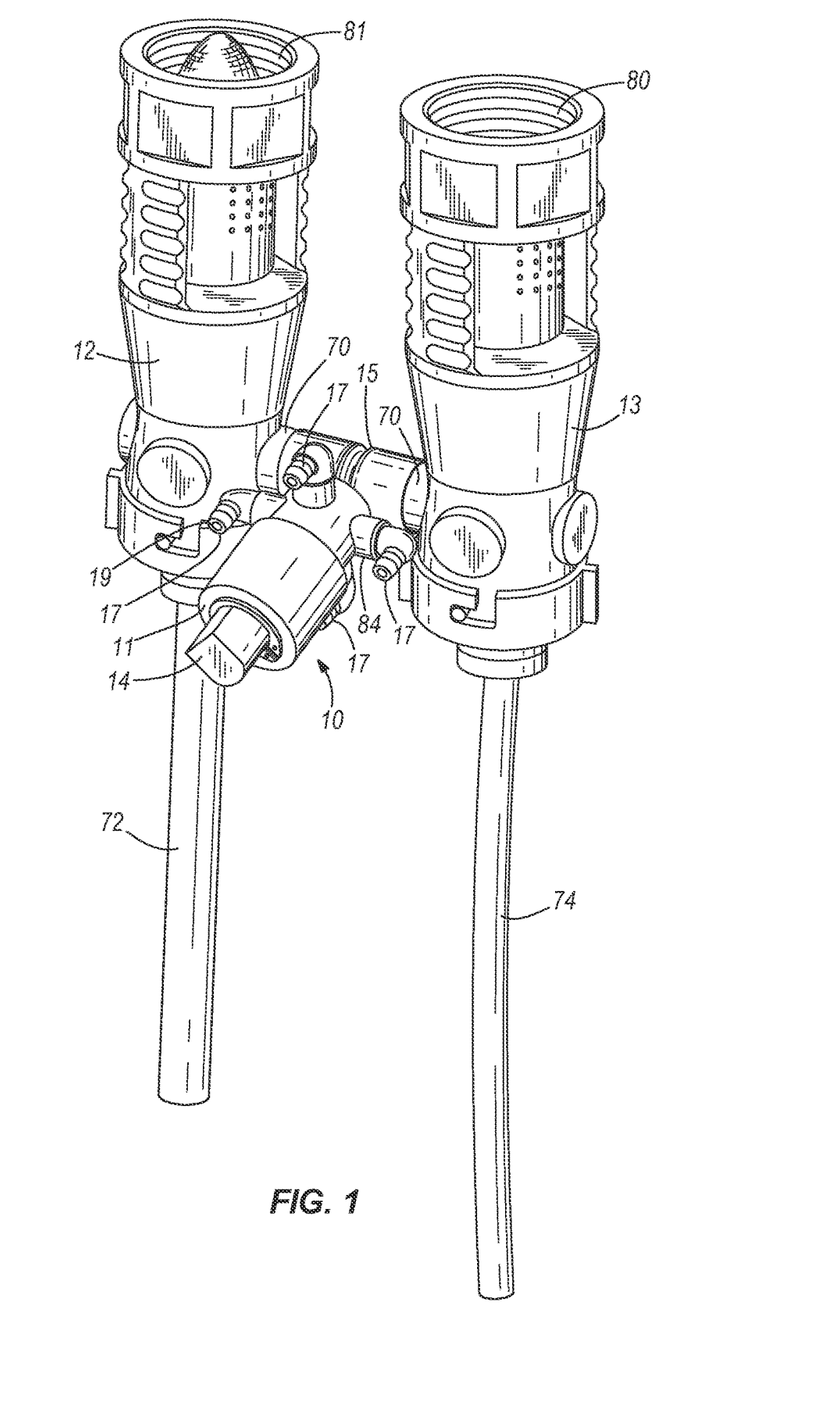
FIG. 1 is a perspective view showing the selector valve assembly connected to two eductors.

Referring to FIG. 1, the selector valve assembly generally 10 is shown in conjunction with two eductors 12 and 13. The preferred eductors are described in commonly owned patent application Ser. No. 11/195,052 filed Aug. 2, 2005 which teachings are incorporated herein. The selector valve assembly 10 includes a valve member 11 with a valve stem 14 housed in a tubular body member 15 to which is connected in a fluid tight manner four fluid intake ports 17, each having nipples 19.

Figure 2:
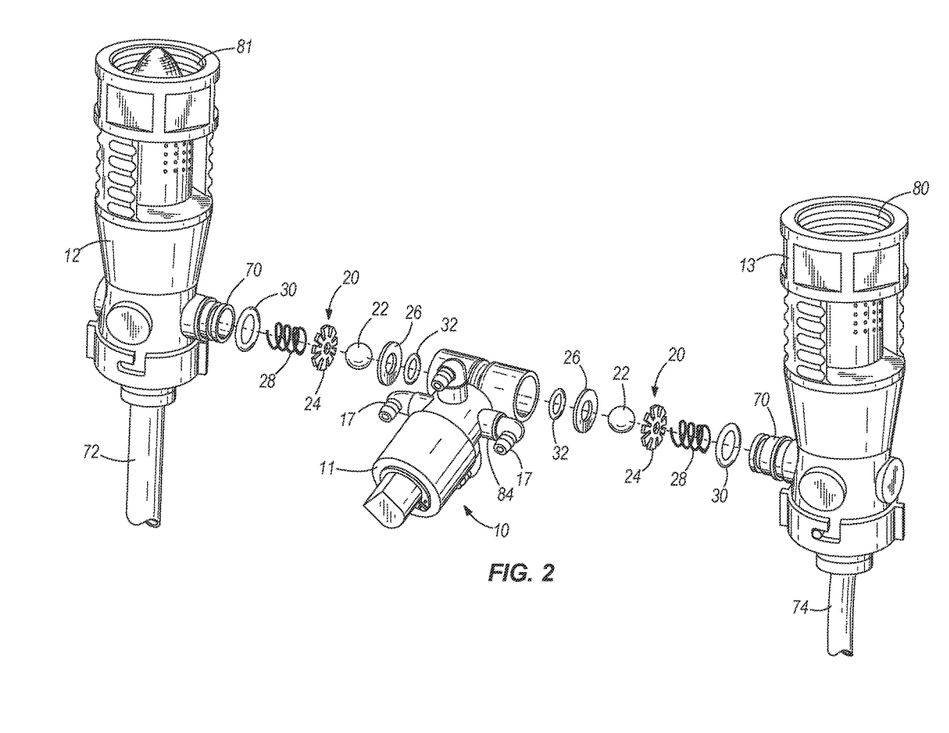
FIG. 2 is an exploded view showing the component parts of the valve for interconnection to the eductors.

As seen in FIG. 2, the selector valve assembly 10 includes two check valve mechanisms generally 20 disposed between the valve member 11 and the eductors 12 and 13. The check valves 20 include check balls 22 and 23. A ball seating washer 26 and check ball guide 24 are also provided as well as a spring 28. Sealing rings are also shown at 30 and 32.

Figure 3:
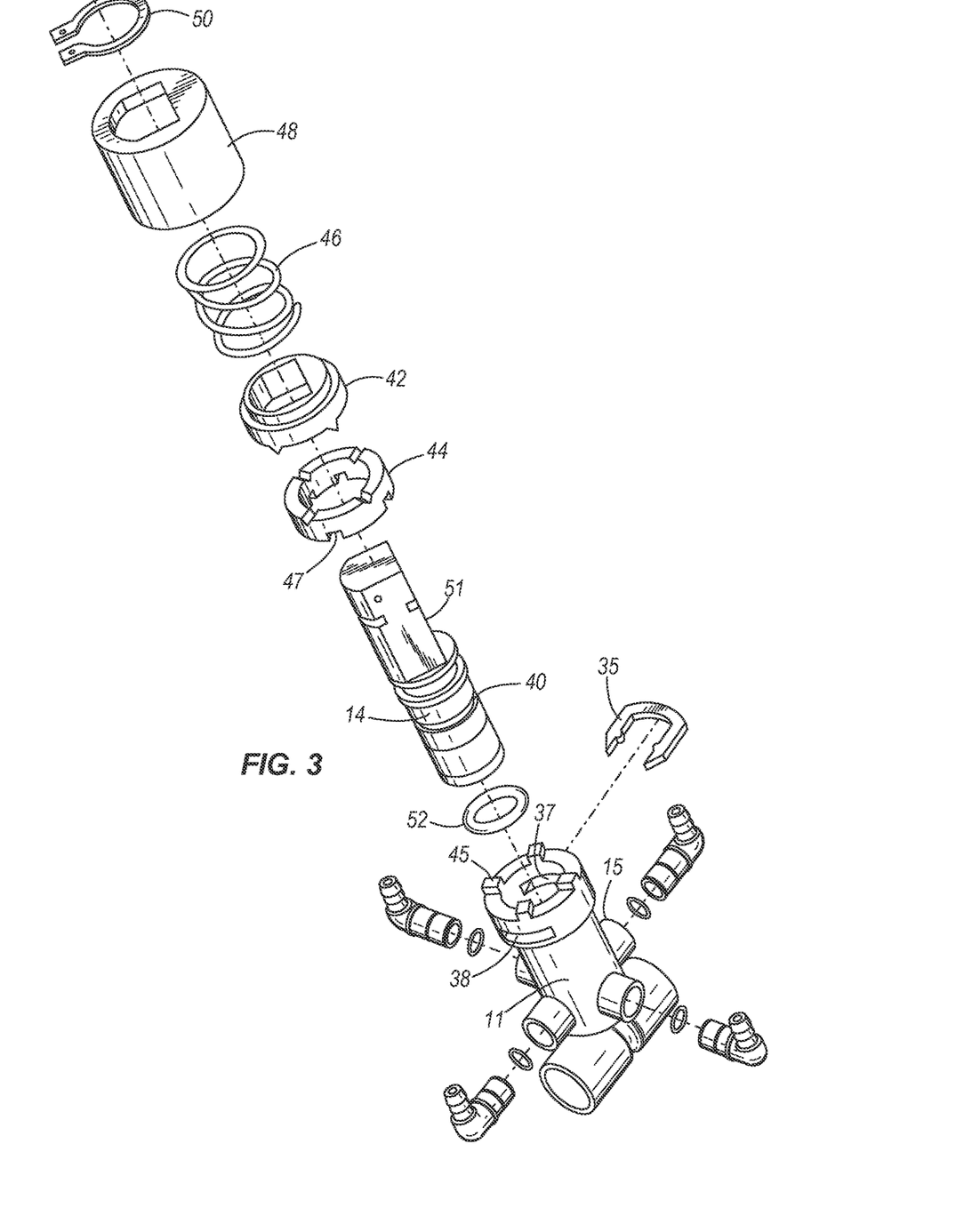
FIG. 3 is another exploded view showing the component parts for placement inside the valve body.
Figure 4:
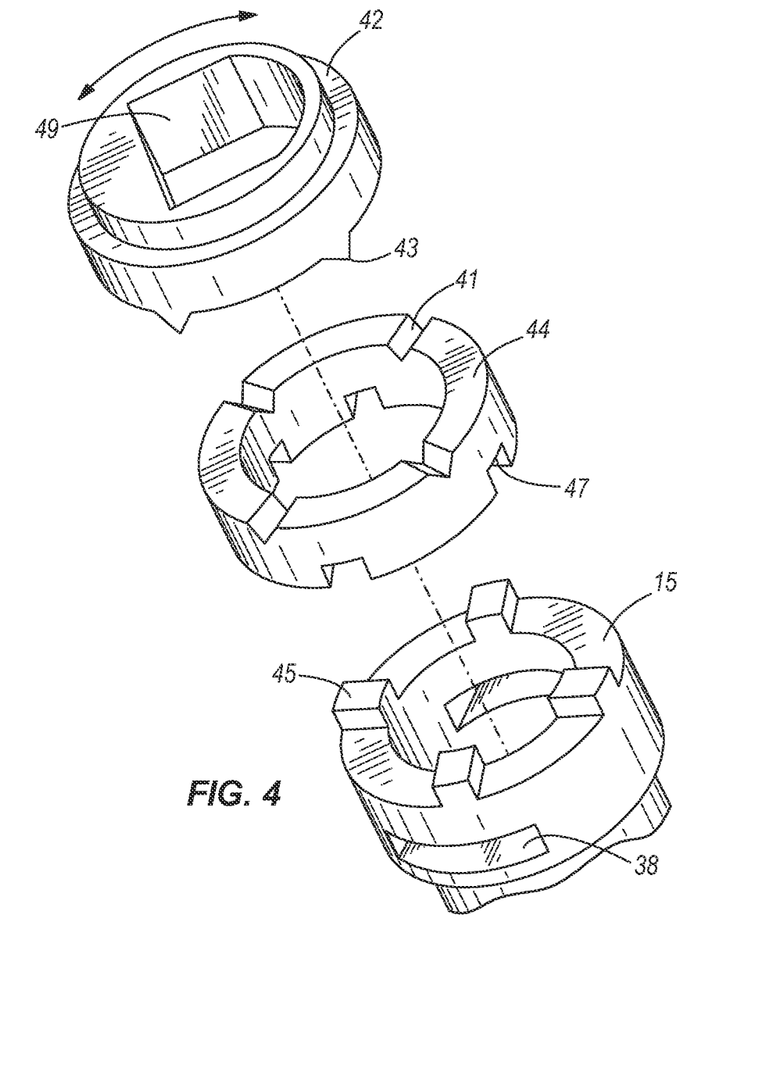
FIG. 4 is still another exploded view showing the valve selector indexing mechanism.
Figure 5:
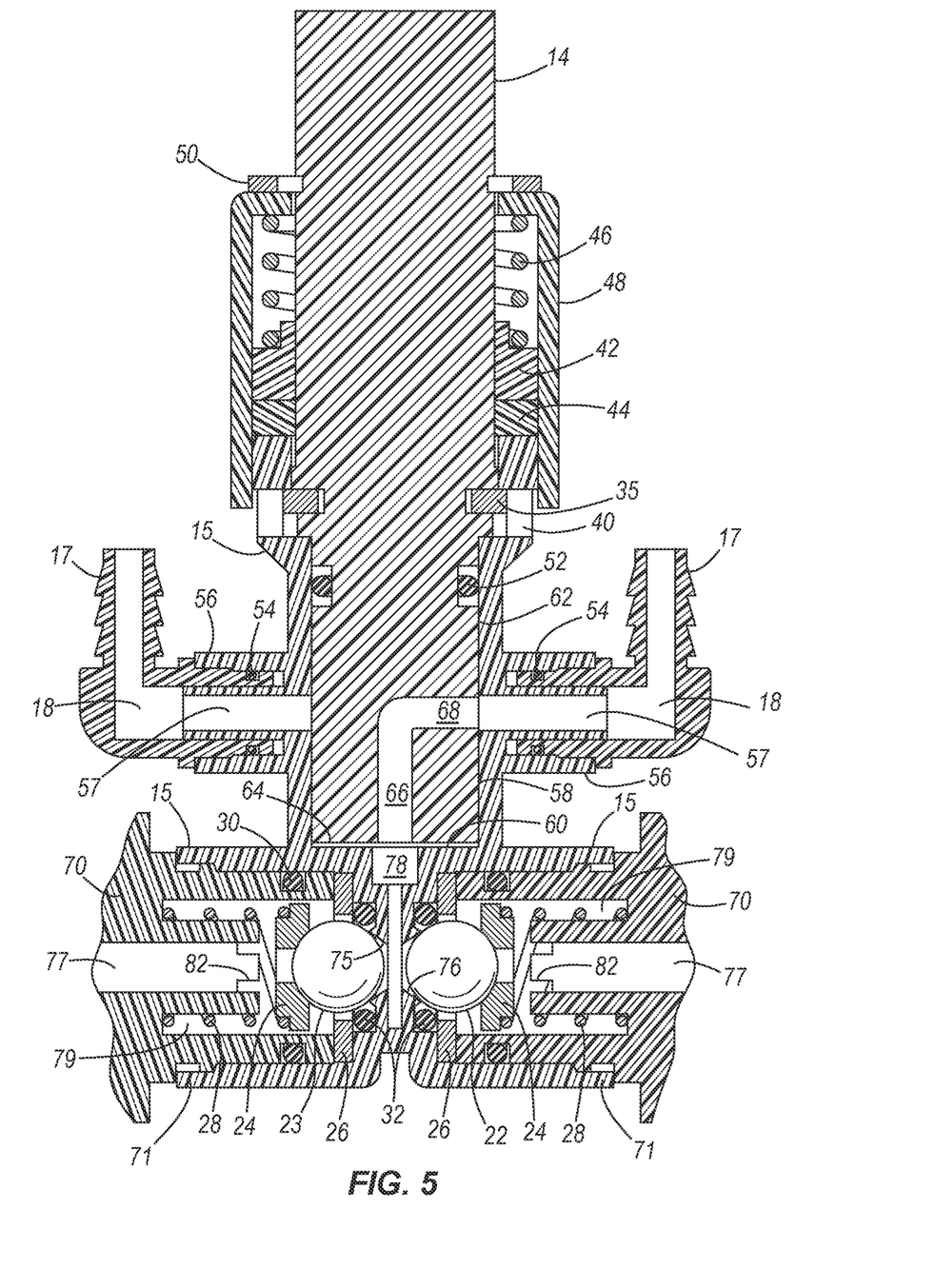
FIG. 5 is a sectional view illustrating one position of the valve.

Referring to FIGS. 3 and 5, valve member 11 is composed of valve stem retainer 35 which fits through slots 37 and 38 in body member 15 and over groove 40 in valve stem 14 to removably retain valve stem 14 in body member 15. An indexing function is provided for the valve stem 14 by means of the indexing plate 42 and indexing receiver 44. Spring 46 biases plate 42 against receiver 44. Indexing receiver 44 is retained on valve stem 14 in a non-rotatable manner by the projections 45 in the body member 15 engaging the cut outs 47 in indexing receiver 44. This is best seen in FIG. 4 where it is also shown the projections 43 on indexing plate 42 for riding over indexing receiver 44 and engaging the indents 41. Indexing plate 42 rotates with valve stem 14 by means of the flat walls, one of which is shown at 49 and the flat side 51 of valve stem 14.

As best seen in FIG. 5, valve body member 15 has a compartment 58 in which valve stem 14 is seated. A seal ring is provided at 52. It also has an end wall 60. A side wall 62 is provided in valve stem 14 as well as an end wall 64. A passageway 66 extends inwardly into valve stem 14 from the end wall thereof and joins passageway 68 which extends inwardly into valve stem 14 from side wall 62.

As also seen in FIG. 5, passages 18 are provided in intake ports 17 and passages 57 are provided in port housings 56 to provide fluid communication with compartment 58 as well as passageway 68 in valve stem 14. Seal rings are shown at 54. It will also be seen in FIG. 5 that body member 15 has eductor ports 71 which connect with eductor ports 70 of eductors 12 and 13. Eductor ports 70 accommodate springs 28 in compartments 79 as well as check ball guides 24. Passages 77 are disposed in eductor ports 70 and communicate with compartment 79. Compartment 79 also accommodates check balls 22 and 23 as they are seated against valve seats 75 and 76 in body member 15. A passage 78 is located in body member and communicates with passageway 66 in valve stem 14 as well as valve seats 75 and 76.

Operation

A better understanding of the selector valve assembly 10 will be had by a description of its operation. Referring to FIGS. 1 and 5, suitable sources of chemical concentrate are connected to intake ports 17 and nipples 19 such as with flexible tubing (not shown). It should be understood that eductor 12 has a faster flow rate than eductor 13. Eductor 12 and hose 72 are employed to fill a bucket, whereas eductor 13 and hose 74 are employed to fill a bottle. When it is desired to fill a bottle, pressurized water is introduced into the inlet 80 of eductor 13. This causes a siphoning effect on check ball 22 by means of passage 77 to move it away from the valve seat 76 to afford fluid communication with passage 78 and in turn passageways 66 and 68. This provides a siphoning effect in intake port 17 to draw chemical concentrate into passage 18, passageways 68, 66, passage 78, compartment 79, past intake portion 82 and into passage 77, in that order. It is ultimately introduced into the water stream in eductor 13 in a well-known manner.

When it is desired to fill a bucket, pressurized water is introduced into the inlet 81 of eductor 12. This causes a reduction in pressure on check ball 23 by means of passage 77 to move it away from valve seat 75 to produce a siphoning effect in passages 78 and passageways 66 and 68 as previously explained in conjunction with eductor 13. This draws chemical concentrate into the eductor 12 and hose 72 as also previously explained. It should be noted that when a siphoning effect is produced on one of the check balls 22 or 23, the other one is seated against its respective valve seal by means of spring 28 and the reduced pressure which moves open the other check ball.

When it is desired to introduce a different chemical concentrate in to the eductors 12 and 13, valve stem 14 is rotated so that passageway 68 is orientated with a different intake port 17. Rotation is facilitated by the indexing plate 42 which is spring loaded against indexing receiver 44 by means of spring 46 held captive in spring retainer 48 by clip 50 secured to valve stem 14. Indexing between indexing plate 42 and indexing receiver 44 is accomplished in a well-known manner. This feature affords a positive locating of the valve stem 14 as well as an audible indicator.

In order to assure that the proper chemical concentrates are connected to the proper intake ports 17, colored bands of different colors can be connected to intake ports such as shown at 84 in FIG. 1.

An important feature of the selector valve assembly 10 are the passageways 66 and 68 in the valve stem 14. These afford less carry-over from one chemical concentrate to the other as passageway 68 is moved from one intake port 17 to another. The reason for this is the cylindrical configuration of valve stem 14 acts as a seamless, continuous chemical pathway for either eductor 12 and 13. The passageways 66 and 68 are preferably of 0.104 inch diameter which affords flow of maximum amount of concentrate with minimum amount of product carry-over. The combined volume of passages 66, 68 and compartments 79 and eductor passages 77 is 0.635 ml. Also the common channel 78 between the check balls 22, 23 and valve seats 76, 75 respectively, is separated by less than 0.100". This combined with the size of the compartments 79 for the check valves 20 and the size of eductor passages 77 minimizes retention of chemical concentrate.

Another important feature is serviceability. In order to service the revolving valve stem 14 or valve cylinder all that is required is to remove clips 50 and 35. The stem 14 can be pulled straight out without removing the selector valve assembly 10 from the eductors 12 and 13 or removing the eductors 80 and 81 and valve assembly 10 from the water valves of a manifold. The spring retaining sleeve 48 connected to the valve stem 14 or handle prevents the clip 35 from backing out of position during use.

The valve assembly 10 allows for a single valve member for use with two eductors. This is a cost savings. It also provides for non unit labeling, where the product is it's own label and the selector valve points toward the intended product. This also allows for a single circuit if an electronic circuit is added for remote monitoring of chemical usage or electronic indicators (flashing lights, LED's, etc.) to further reinforce proper product selection.

The preferred material for manufacturing the selector valve stem 14 is Teflon®. The body member 15 is preferably manufactured from polypropylene.

However, other moldable plastic materials could be employed such as a polypropylene copolymer.

The detent on indexing plate 42 affords a stop and audible indicator for the position of the selector valve assembly 10. If desired, it could be eliminated as could the color bands 84. While the selector valve assembly 10 has been illustrated with four intake ports 17 for chemical concentrates, the selector valve can operate with fewer intake ports such as two, or a greater number such as eight. AU such modifications within the spirit of the invention are meant to be within a scope as defined by the appended claims.

What is claimed is:

1. A method of controlling the flow of different flow paths of fluid comprising:
   rotating a valve having a valve body to a first position;
   establishing fluid communication between an aperture of the valve and a first concentrate upon rotation of the valve to the first position;
   receiving the first concentrate in the first position;
   discharging the first concentrate through only one of two outlets, the outlets fluidly connected to the aperture at the same time;
   rotating the valve to a second position;
   establishing fluid communication between the aperture and a second concentrate upon rotation of the valve to the second position;
   receiving the second concentrate in the second position; and
   discharging the second concentrate through only one of the two outlets,
   wherein rotating the valve to the first position aligns the aperture with a first inlet and rotating the valve to the second position aligns the aperture with a second inlet, and
   wherein the first and second inlets are circumferentially arranged at an axial position on the valve body.

2. The method of claim 1, further comprising after the step of receiving a first concentrate in the first position: directing the first concentrate through a passageway provided in the valve.

3. The method of claim 2, wherein directing the first concentrate through a passageway provided in the valve further comprises: the passageway being sized to retain less than approximately 2 milliliters of concentrate.

4. The method of claim 2, further comprising after the step of receiving a second concentrate in the second position: directing the second concentrate through the passageway provided in the valve.

5. The method of claim 1, wherein the step of receiving a first concentrate in the first position further comprises: receiving a first concentrate in the first position from a first port.

6. The method of claim 5, wherein the step of receiving a second concentrate in the second position further comprises: receiving a second concentrate in the second position from a second port.

7. The method of claim 6, further comprising after the step of receiving a first concentrate in the first position: directing the first concentrate through a passageway provided in the valve.

8. The method of claim 7, further comprising after the step of receiving a second concentrate in the second position: directing the second concentrate through the passageway provided in the valve.

9. The method of claim 1, wherein the step of discharging the first concentrate through one of two outlets further comprises: a first of the two outlets being in fluid connection with a first eductor, and a second of the two outlets being in fluid connection with a second eductor.

10. The method of claim 9, wherein the step of discharging the first concentrate through one of two outlets further comprises: the first eductor having a faster flow rate than the second eductor.

11. The method of claim 1, further comprising:
    rotating the valve to a third position;
    establishing fluid communication between the aperture and a first concentrate upon rotation of the valve to the third position;
    receiving the third concentrate in the third position; and
    discharging the third concentrate through only one of the two outlets.

12. The method of claim 11, further comprising:
    rotating the valve to a fourth position;
    establishing fluid communication between the aperture and a fourth concentrate upon rotation of the valve to the fourth position;
    receiving the fourth concentrate in the fourth position; and
    discharging the fourth concentrate through only one of the two outlets.

13. A method of operating a selector valve assembly to control the flow of different flow paths of fluid comprising:
    rotating a member provided in the valve assembly between a plurality of positions;
    fluidly connecting one of a plurality of concentrates to a plurality of outlets at the same time via an inlet at each position, the inlets of the plurality of positions circumferentially arranged and aligned with each other on the valve assembly;
    rotating the member to a first position of the plurality of positions;
    receiving one of the plurality of concentrates; and
    discharging one of the plurality of concentrates through only one of the outlets.

14. The method of claim 13, further comprising after the receiving step: transporting one of the plurality of concentrates through a passageway provided through the member.

15. The method of claim 14, wherein the transporting step further comprises: transporting one of the plurality of concentrates through a passageway extending from a sidewall of the member through the member.

16. The method of claim 14, wherein the transporting step further comprises: transporting one of the plurality of concentrates through a first passageway extending into the member from a side wall of the member to a second passageway extending into the member from an end wall of the member.

17. The method of claim 14, wherein the transporting step further comprises: the passageway being sized to retain less than approximately 2 milliliters of concentrate.

18. The method of claim 13, wherein the rotating step further comprises: each of the plurality of outlets being in fluid connection with a separate eductor.

19. The method of claim 18, wherein the rotating step further comprises: each separate eductor has a different flow rate.

20. A method of controlling the flow of different flow paths of fluid comprising:
rotating a valve stem of a valve to a first position;
establishing fluid communication between an aperture of the valve stem and a first concentrate upon rotation of the valve to the first position;
receiving the first concentrate in the first position;
discharging the first concentrate through only one of two outlets, the outlets fluidly connected to the aperture at the same time;
rotating the valve stem to a second position;
establishing fluid communication between the aperture and a second concentrate upon rotation of the valve stem to the second position;
receiving the second concentrate in the second position; and
discharging the second concentrate through only one of the two outlets,
wherein rotating the valve stem to the first position aligns the aperture with a first inlet and rotating the valve stem to the second position aligns the aperture with a second inlet, and
wherein the first and second inlets are circumferentially arranged at an axial position on the valve.

21. The method of claim 20, further comprising after the step of receiving a first concentrate in the first position: directing the first concentrate through a passageway provided in the valve.

22. The method of claim 21, wherein directing the first concentrate through a passageway provided in the valve further comprises: the passageway being sized to retain less than approximately 2 milliliters of concentrate.

23. The method of claim 21, further comprising after the step of receiving a second concentrate in the second position: directing the second concentrate through the passageway provided in the valve.

24. The method of claim 20, wherein the step of receiving a first concentrate in the first position further comprises: receiving a first concentrate in the first position from a first port.

25. The method of claim 24, wherein the step of receiving a second concentrate in the second position further comprises: receiving a second concentrate in the second position from a second port.

26. The method of claim 25, further comprising after the step of receiving a first concentrate in the first position: directing the first concentrate through a passageway provided in the valve.

27. The method of claim 26, further comprising after the step of receiving a second concentrate in the second position: directing the second concentrate through the passageway provided in the valve.

28. The method of claim 20, wherein the step of discharging the first concentrate through one of two outlets further comprises: a first of the two outlets being in fluid connection with a first eductor, and a second of the two outlets being in fluid connection with a second eductor.

29. The method of claim 28, wherein the step of discharging the first concentrate through one of two outlets further comprises: the first eductor having a faster flow rate than the second eductor.

30. The method of claim 20, further comprising:
rotating the valve to a third position;
establishing fluid communication between the aperture and a third concentrate upon rotation of the valve to the third position;
receiving the third concentrate in the third position; and
discharging the third concentrate through only one of the two outlets.

31. The method of claim 30, further comprising:
rotating the valve to a fourth position;
establishing fluid communication between the aperture and a fourth concentrate upon rotation of the valve to the fourth position;
receiving the fourth concentrate in the fourth position; and
discharging the fourth concentrate through only one of the two outlets.

32. A method of controlling the flow of different flow paths of fluid comprising:
rotating a valve to a first position in which the valve points to a first concentrate;
receiving a first concentrate in the first position through a first inlet;
discharging the first concentrate through only one of two outlets;
rotating the valve to a second position in which the valve points to a second concentrate;
receiving a second concentrate in the second position through a second inlet circumferentially arranged and aligned with the first inlet on the valve; and
discharging the second concentrate through only one of the two outlets,
wherein the outlets are fluidly connected to the first inlet at the same time, and fluidly connected to the second inlet at the same time.

33. The method of claim 32, further comprising after the step of receiving a first concentrate in the first position: directing the first concentrate through a passageway provided in the valve.

34. The method of claim 33, wherein directing the first concentrate through a passageway provided in the valve further comprises: the passageway being sized to retain less than approximately 2 milliliters of concentrate.

35. The method of claim 32, further comprising after the step of receiving a second concentrate in the second position: directing the second concentrate through the passageway provided in the valve.

36. The method of claim 32, wherein the step of receiving a first concentrate in the first position further comprises: receiving a first concentrate in the first position from a first port.

37. The method of claim 36, wherein the step of receiving a second concentrate in the second position further comprises: receiving a second concentrate in the second position from a second port.

38. The method of claim 37, further comprising after the step of receiving a first concentrate in the first position: directing the first concentrate through a passageway provided in the valve.

39. The method of claim 38, further comprising after the step of receiving a second concentrate in the second position: directing the second concentrate through the passageway provided in the valve.

40. The method of claim 32, wherein the step of discharging the first concentrate through one of two outlets further comprises: a first of the two outlets being in fluid connection with a first eductor, and a second of the two outlets being in fluid connection with a second eductor.

41. The method of claim 40, wherein the step of discharging the first concentrate through one of two outlets further comprises: the first eductor having a faster flow rate than the second eductor.

42. The method of claim 32, further comprising:
rotating the valve to a third position in which the valve points to a third concentrate;
receiving the third concentrate in the third position through a third inlet; and
discharging the third concentrate through only one of the two outlets, the outlets fluidly connected to the third inlet at the same time.

43. The method of claim 42, further comprising:
rotating the valve to a fourth position in which the valve points to a fourth concentrate;
receiving the fourth concentrate in the fourth position through a fourth inlet circumferentially arranged and aligned with the third inlet on the valve; and
discharging the fourth concentrate through only one of the two outlets, the outlets fluidly connected to the fourth inlet at the same time.

\* \* \* \* \*

UNITED STATES PATENT AND TRADEMARK OFFICE
CERTIFICATE OF CORRECTION

PATENT NO. : 9,732,862 B2  
APPLICATION NO. : 14/166544  
DATED : August 15, 2017  
INVENTOR(S) : Steven E. Schiller et al.

It is certified that error appears in the above-identified patent and that said Letters Patent is hereby corrected as shown below:

On the Title Page

At Item (54) and in the Specification, at Column 1, Lines 1 and 2 replace "TWO EDUCATOR/FOUR-WAY SELECTOR VALVE ASSEMBLY" with --TWO EDUCTOR/FOUR-WAY SELECTOR VALVE ASSEMBLY--

Signed and Sealed this  
Twenty-fifth Day of December, 2018

Andrei Iancu  
*Director of the United States Patent and Trademark Office*